United States Patent [19]

Weitzman et al.

[11] Patent Number: 5,566,066

[45] Date of Patent: Oct. 15, 1996

[54] METHOD OF RECYCLING USED BEVERAGE CONTAINERS

[75] Inventors: David H. Weitzman; Jeffrey M. Young, both of Vestal, N.Y.

[73] Assignee: Resource Recycling Technologies, Inc., Vestal, N.Y.

[21] Appl. No.: 201,836

[22] Filed: Feb. 25, 1994

[51] Int. Cl.$^6$ .................................................. G06F 17/60
[52] U.S. Cl. ...................................... 364/403; 364/401 R
[58] Field of Search ................................. 364/403, 401, 364/464, 466, 478, 522, 554; 209/539, 583, 644, 551; 194/212

[56] References Cited

U.S. PATENT DOCUMENTS

| | | | |
|---|---|---|---|
| 4,519,307 | 5/1985 | La Barge et al. | 100/99 |
| 4,579,216 | 4/1986 | DeWoolfson et al. | 194/212 |
| 4,580,226 | 4/1986 | Bennison | 364/478 |
| 4,667,291 | 5/1987 | Weitzman et al. | 364/401 |
| 4,717,026 | 1/1988 | Fischer et al. | 209/509 |
| 4,829,428 | 5/1989 | Weitzman et al. | 364/401 |

*Primary Examiner*—Robert A. Weinhardt
*Assistant Examiner*—Frantzy Poinvil
*Attorney, Agent, or Firm*—Salzman & Levy

[57] ABSTRACT

A recycling or redemption method for returning empty beverage containers to a retail establishment is featured. A typical retail establishment processes a typical monthly average of containers. Such data is available from retail receipts and accounting records. Sampling sizes are based on the overall commodity population. Using this predetermined sample count, returned empties are batch stored in transitional receptacles that, when filled, contain at least the number of containers required for a given statistical accuracy. Empties are stored in the transitional receptacles by commodity or type (i.e., by glass, plastic or aluminum). Glass containers may be further sorted by color. As each transitional receptacle is filled, it displaces another filled receptacle situated on the floor of the facility. The transitional receptacle now becomes the full receptacle located on the floor of the facility. The previous, filled receptacle is removed to a bulk storage area. The filled receptacles standing on the floor of the facility are randomly and periodically assessed (i.e., sampled) as to their contents; data relating to the particular container brands is entered and stored in computer memory. The gross brand count per month, is derived and then used to bill the distributor for the properly attributable empties.

20 Claims, 1 Drawing Sheet

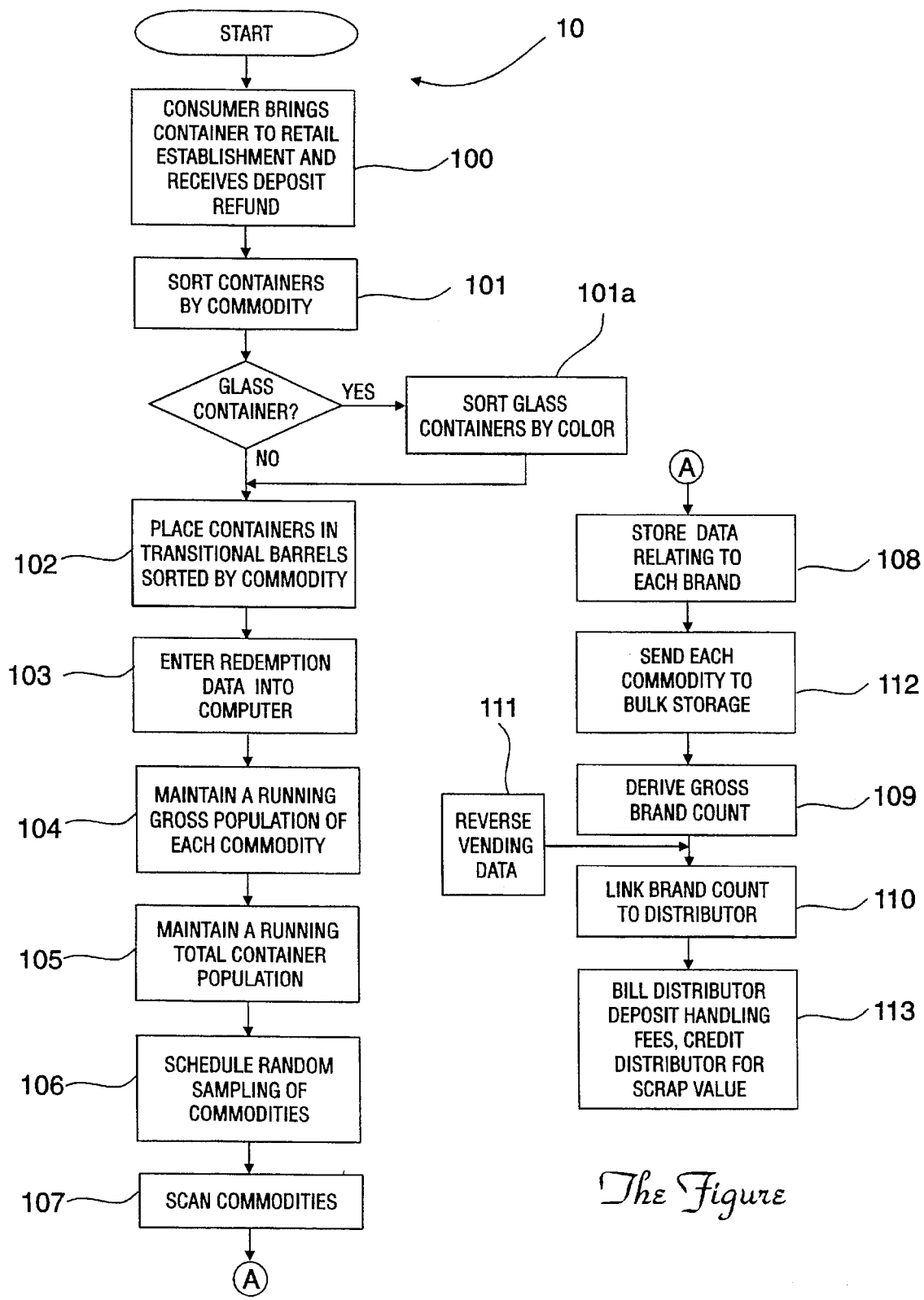

METHOD OF RECYCLING USED BEVERAGE CONTAINERS

FIELD OF THE INVENTION

The present invention pertains to a method of recycling used beverage containers, such as aluminum cans and bottles made of glass and/or plastic, and, more particularly, to an improved method of redeeming, sorting, storing and accounting for empty containers at the retail level.

BACKGROUND OF THE INVENTION

Several years ago, New York State enacted a mandatory recycling law stipulating that a retailer of certain beverages (such as soda and beer) is required to charge the buyer a minimum deposit on each container. This deposit is then refundable to the consumer upon the return of the empty container to the vendor, thus encouraging the public to recycle. The vendors are required by law to store and keep an inventory of these empty containers. The retailers are then for each container redeemed by the distributors of each brand.

Understandably, the law became unpopular with both beverage distributors and retail establishments alike, due to the problems associated with the added burdens of keeping inventories of the empty containers and accounting for the refunds of the redeemed containers. Each container requires accounting according to its brand name, size and type of material (i.e., glass, plastic or aluminum).

Various computerized methods were invented to provide beverage retailers and distributors with easier ways of sorting, storing and accounting for the empties. Two such methods are illustrated in U.S. Pat. Nos. 4,667,291 (issued to Weitzman et al on May 19, 1987); and 4,829,428 (issued to Weitzman et al on May 9, 1989).

Despite the improved methods described in the aforesaid patents, however, the task of accounting for the tens and hundreds of thousands of empty containers of various brands, sizes and types was still daunting, being both inconvenient and troublesome for retailers and distributors.

The major problem experienced by the retailers is is having to account for each redeemed can or bottle by its brand name, in order that each distributor be charged for his or her share of the redemption costs. When retailers carry many different brands, this task becomes both burdensome and complicated. Since each distributor of a particular brand is required to reimburse the retailer, the multiple accountings can become almost unmanageable. This, therefore, discourages all but the largest establishments from carrying a large selection of brands. Clearly, this limits any incentive to carry those products having limited sales appeal.

The second greatest problem encountered after passage of the mandatory recycling law is the enormous amounts of time required to implement and operate the ramifications of such a system.

Still another problem to be faced is the need for the trained personnel who are required to program and operate the computers needed to maintain this aspect of the recycling law.

The present invention reflects the discovery that the entire procedure of sorting, storing and accounting for the empty containers can be greatly streamlined and made less burdensome by applying sampling techniques using statistical methodologies.

The sampling technique of this invention can actually provide a more accurate determination of the container population than the former procedure of accounting for each and every empty. One reason that the old method is less accurate than that of the inventive method is undoubtedly due to the higher, naturally occurring inaccuracies resulting from the enormous numbers and the great variety of empties requiring processing.

The current inventive method provides a dramatic reduction in the amount of data needed to be entered, stored and processed by computer. The current procedure is more economical and less burdensome in many ways for the retailers.

The sampling technique of the invention is based upon a statistical curve of the overall population of empties according to commodity. The method provides data having an accuracy to within a small, acceptable percentage of error. No longer will the retailers have to sort, scan or key-enter containers by brand, size and type. The requirement for many separate storage areas or bins will be eliminated and will, in and of itself, be a great cost savings, eradicating the unwieldy nature of the accounting process. Therefore, the invention will provide a more convenient and economical method of sorting and accounting.

The sorting and sampling of representative, random batches in accordance with the current invention requires a transitional storage and accounting for the batch samples. One such accounting technique used herein is based on FIFO, i.e., first in is first out. The retail establishment counts and sorts containers only by commodity or type, i.e., aluminum cans and containers of plastic or glass. Glass containers may be further sorted according to color. Distributors are linked to each brand of container by appropriate processing software. The billing of each distributor for redemption is based on a given brand's percentage of the container count in the batch. This brand percentage is multiplied by the total or gross container count to assess the distributor's liability.

The present inventive method also allows for the introduction, inclusion or integration of reverse vending counts, as well as other accounting data obtained from other redemption systems. Such aforementioned data can be added to the batch sample data of this invention in order to provide a comprehensive accounting process.

SUMMARY OF THE INVENTION

In accordance with the present invention, there is provided a recycling or redemption method for returning empty beverage containers to a retail establishment. A typical retail establishment processes a typical monthly average of containers. Such data is available from retail receipts and accounting records. The sampling sizes used in the invention are based on the overall commodity population. In other words, a certain sample size will provide a given sampling accuracy in accordance with the total commodity count. This overall population data, however, can be periodically updated, if it is determined that the sampling sizes need adjustment.

Using this predetermined sample count, returned empties are batch stored in transitional receptacles, containers or barrels that, when a prescribed number thereof are filled, contain at least the number of containers required for a given statistical accuracy. Empties are stored in the transitional receptacles by commodity or type (i.e., by glass, plastic or aluminum). Glass containers may be further sorted by color.

As each transitional receptacle is filled, it displaces another filled receptacle disposed on the floor of the facility. The transitional receptacle then becomes the full receptacle disposed on the floor of the facility. The previous, filled receptacle is removed to a bulk receptacle area where its contents are mingled with the contents from previous dumpings of containers of the same type.

The filled receptacles standing on the floor of the facility are randomly and periodically assessed (i.e., sampled) as to their contents; data relating to the particular container brands is entered and stored in computer memory. The gross brand count per month, for example, is derived by multiplying the percentage of each brand in the batch sample with the total count of the container population in the dumped population in bulk storage. This gross brand count is then used to bill the distributor for the properly attributable number of empties. Each brand in the batch is entered into computer memory by a scanning of its UPC or bar code.

The gross count is derived by weighing the receptacle when empty and when full, subtracting the difference and multiplying by the average container weight factor. The entered data is processed by the computer, and each distributor of a particular brand can thereafter be billed for his or her share of the redeemed empties, minus a credit for the scrap value thereof. Data from reverse vending machines or other redemption systems can also be added or integrated with the invention's data. The data is then processed by the computer to adjust the distributor's billing.

It is an object of this invention to provide an improved method of sorting and accounting for empty beverage containers brought to a retailer for redemption.

It is another object of the invention to reduce the heretofore necessary amount of time spent sorting and counting, in order to satisfactorily redeem empty beverage containers at the retail level.

It is a further object of this invention to provide statistical sampling techniques for assessing the numbers and types of empty beverage containers brought to a retailer for redemption.

It is still a further object of the invention to provide a low-cost redemption accounting system.

It is yet another object of the invention to provide an accounting method for redemption of empty beverage containers at the retail level that is compatible with, and which can integrate the data of, other accounting systems (such as those utilizing reverse vending techniques).

These and other objects of the invention will be better understood and become more apparent with reference to the subsequent detailed description.

BRIEF DESCRIPTION OF THE DRAWING

A complete understanding of the present invention may be obtained by reference to the accompanying drawing, when considered in conjunction with the subsequent detailed description, in which:

THE FIGURE illustrates a flow chart diagram of the method utilized in this invention.

DESCRIPTION OF THE PREFERRED EMBODIMENT

Generally speaking, the method of this invention features a more accurate and facile sorting and accounting technique for assessing the number and brand of empty beverage containers being redeemed at retail establishments. The method requires a random, periodic sampling of small numbers of containers that are sorted with respect to commodity, i.e., according to glass or plastic bottles, or aluminum cans. Glass bottles may be additionally sorted according to color. The counts of each brand in the sample are reduced to a percentage, which, when multiplied by the gross container count for that commodity, will provide the billing information of a distributor's accountability to the retailer (minus the credit applied for scrap values).

Referring to THE FIGURE, a flow chart diagram 10 illustrates the method of the invention. It will be obvious to those skilled in the art that certain steps of the process may be executed in an order other than that chosen for disclosure. The method is initiated by the return of the empty beverage containers to a return center or retail establishment, where the individual making the return is paid for each empty returned, as shown by block 100. Redemption data is entered into a computer according to block 103, and a running gross population of each commodity is maintained in the computer in accordance with block 104. Simultaneously therewith, the containers are sorted according to commodity, i.e., aluminum cans, glass bottles and plastic bottles (block 101), and the sorted empty containers are placed in transitional barrels or receptacles according to commodity, as depicted in block 102. Glass containers can be additionally sorted by color, as shown by block 101a, and then placed in the transitional receptacles. The number of containers returned by commodity, or the data reflecting redemption receipts, is entered into the computer to provide the total redemption population, as illustrated by block 105, and this data can then be used to determine a sampling size or receptacle size for block 102, according to a multinomial distribution curve. A periodic running total of the redemption population is stored in computer memory (such as weekly, monthly and annual container population count), which is then multiplied by percentage brand information. This data is then utilized in the final billing of the distributors of the various brands of containers that have been returned, in accordance with final procedure block 113. The multinomial distribution provides a sampling with a desired accuracy. The sample size can be determined from the population data according to the statistical curve, which is typically shown below in Table 1.

TABLE 1

| Total monthly receipts by commodity | Schedule of Sample Sizes | | |
| --- | --- | --- | --- |
| | Recommended Sample Size | | |
| | Weekly | Monthly | Annually |
| 500 | 100 | 400 | 5200 |
| 1000 | 200 | 800 | 10400 |
| 2000 | 300 | 1200 | 15600 |
| 5000 | 425 | 1700 | 22100 |
| 10000 | 500 | 2000 | 26000 |
| 25000 | 600 | 2400 | 31200 |
| 50000 | 600 | 2400 | 31200 |
| 100000 | 610 | 2440 | 31720 |
| Larger | 625 | 2500 | 32500 |

Note:
The total monthly receipts represent the population size. The distribution size was determined using a multinomial distribution. Other distributions that could be used for this purpose are Poisson and normal approximation distributions.

The statistical distribution curve may vary with population type or size. The above scheduling Table 1 is based on a typical statistical distribution curve that will provide a sampling accuracy of ± 2% with a 95% confidence level for the given populations on a monthly basis. Finer accuracy will obviously require greater sample sizes.

Utilizing this sample size data, the physical size and number of the transitional barrels or receptacles of block 102 can be determined. For each container of a given commodity (e.g., aluminum cans), the receptacle's physical size and the quantity of such receptacles are chosen to accommodate at least the required number of samples necessary for the chosen periodic sampling window.

The following description pertains to a typical pair of transitional receptacles in a FIFO arrangement, albeit more than one receptacle pair is usually employed for each commodity being sorted.

A pair of receptacles for each commodity being redeemed is disposed side by side on the facility floor, in accordance with the step shown in block 102. The first receptacle of the pair is filled, and then the second. When the second receptacle of the pair is filled, the first receptacle is emptied into a gross population bin for that commodity (block 112).

The emptied receptacle is then returned to its place beside the second receptacle; the two receptacles essentially reverse places, such that the first receptacle is now the second receptacle, and vice versa. The process of filling and emptying the receptacles is continuously advanced, and the gross count continuously updated.

Next, each commodity is scheduled for random, periodic sampling, in accordance with block 106. The filled receptacles standing on the floor of the facility are randomly and periodically assessed (i.e., sampled) as to their contents; data relating to the brand of the containers is entered and stored in computer memory, in accordance with block 108. The gross brand count per month (block 109), for example, is derived by multiplying the percentage of each brand in the batch sample with the total count of the container population for that commodity in the dumped, stored population in bulk storage (block 112). This gross brand count is then used to link the distributor to the empties attributable to him, as per block 110. Each brand in the batch will be entered into computer memory by a scanning of its UPC or bar code labelled on each container, as illustrated in block 107.

Data from reverse vending machines or other accounting systems can also be added and integrated with the data of this invention, in accordance with block 111. The computer will process the retail store data and other integrated data, adjusting the distributor's billing, as illustrated in block 113.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of redeeming empty containers that are characterized according to their brand and commodity, commodity characterization being defined by material type, such as glass, plastic and aluminum, said method comprising the steps of:

a) entering redemption data into a computer system;

b) batch sorting redeemed empty containers according to commodity;

c) performing random sampling of batches of sorted commodity to determine a brand count in each batch, said random sampling including a transitional handling and storage of batch storage containers that contain batches to be sampled that are non-randomly distributed; and d) determining a gross brand count for each sorted commodity.

2. The method of redeeming empty containers that are characterized according to their brand and commodity, in accordance with claim 1, wherein brand count is determined in each batch in accordance with step (c) by means of scanning code-labelled containers.

3. The method of redeeming empty containers that are characterized according to their brand and commodity, in accordance with claim 1, wherein batch sorting in accordance with step (c) is performed on a periodic basis.

4. The method of redeeming empty containers that are characterized according to their brand and commodity, in accordance with claim 1, further comprising the step (e) of linking said gross brand count, in accordance with step (d), with a distributor of said brand.

5. The method of redeeming empty containers that are characterized according to their brand and commodity, in accordance with claim 1, further comprising the step of:

e) bulk storing each commodity.

6. The method of redeeming empty containers that are characterized according to their brand and commodity, in accordance with claim 1, further comprising the step of:

e) adding reverse vending data to said gross brand count derived in step (d).

7. The method of redeeming empty containers that are characterized according to their brand and commodity, in accordance with claim 1, wherein glass commodities are sorted in accordance with step (b) by color.

8. A method of redeeming empty containers that are characterized according to their brand and commodity, said method comprising the steps of:

a) entering redemption data into a computer system;

b) batch sorting redeemed empty containers according to commodity;

c) scheduling and performing a sampling of batches of sorted commodity to determine a brand count in each batch, said random sampling including a transitional handling and storage of batch storage containers that contain batches to be sampled that are non-randomly distributed; and d) determining a gross brand count for each sorted commodity.

9. The method of redeeming empty containers that are characterized according to their brand and commodity, in accordance with claim 8, wherein brand count is determined in each batch in accordance with step (c) by means of scanning code-labelled containers.

10. The method of redeeming empty containers that are characterized according to their brand and commodity, in accordance with claim 8, wherein batch sorting in accordance with step (c) is performed on a periodic basis.

11. The method of redeeming empty containers that are characterized according to their brand and commodity, in accordance with claim 8, further comprising the step (e) of linking said gross brand count in accordance with step (d) with a distributor of said brand.

12. The method of redeeming empty containers that are characterized according to their brand and commodity, in accordance with claim 8, further comprising the step of:

e) bulk storing each commodity.

13. The method of redeeming empty containers that are characterized according to their brand and commodity, in accordance with claim 8, further comprising the step of:

e) adding reverse vending data to said gross brand count derived in step (d).

14. The method of redeeming empty containers that are characterized according to their brand and commodity, in accordance with claim 8, wherein glass commodities are sorted in accordance with step (b) by color.

15. A method of redeeming empty containers that are characterized according to their brand and commodity, said method comprising the steps of:

a) entering redemption data into a computer system;
   b) batch sorting redeemed empty containers according to commodity;
   c) bulk storing empty containers according to commodity;
   d) scheduling and performing a sampling of batches of sorted commodity to determine a brand count in each batch, said random sampling including a transitional handling and storage of batch storage containers that contain batches to be sampled that are non-randomly distributed; and
   e) determining a gross brand count for each sorted commodity.

16. The method of redeeming empty containers that are characterized according to their brand and commodity, in accordance with claim 15, wherein brand count is determined in each batch in accordance with step (d) by means of scanning code-labelled containers.

17. The method of redeeming empty containers that are characterized according to their brand and commodity, in accordance with claim 15, wherein batch sorting in accordance with step (d) is performed on a periodic basis.

18. The method of redeeming empty containers that are characterized according to their brand and commodity, in accordance with claim 15, further comprising the step of:

f) linking said gross brand count in accordance with step (e) with a distributor of said brand.

19. The method of redeeming empty containers that are characterized according to their brand and commodity, in accordance with claim 7, further comprising the step of:

e) adding reverse vending data to said gross brand count derived in step (d).

20. The method of redeeming empty containers that are characterized according to their brand and commodity, in accordance with claim 15, wherein glass commodities are sorted in accordance with step (b) by color.

\* \* \* \* \*